United States Patent
Sugimura (10) Patent No.: US 11,031,673 B2
(45) Date of Patent: Jun. 8, 2021

(54) RF TAG ANTENNA, RF TAG, AND RF TAG HAVING CONDUCTIVE BODY FORMED THEREIN

(71) Applicant: PHOENIX SOLUTION CO., LTD., Kanazawa (JP)

(72) Inventor: Shiro Sugimura, Kanazawa (JP)

(73) Assignee: PHOENIX SOLUTION CO., LTD., Ishikawa (JP)

( * ) Notice: Subject to any disclaimer, the term of this patent is extended or adjusted under 35 U.S.C. 154(b) by 0 days.

(21) Appl. No.: 16/650,472

(22) PCT Filed: Sep. 19, 2018

(86) PCT No.: PCT/JP2018/034537
§ 371 (c)(1),
(2) Date: Mar. 25, 2020

(87) PCT Pub. No.: WO2019/065377
PCT Pub. Date: Apr. 4, 2019

(65) Prior Publication Data
US 2020/0243944 A1 Jul. 30, 2020

(30) Foreign Application Priority Data

Sep. 26, 2017 (JP) .............................. JP2017-185385

(51) Int. Cl.
*H01Q 1/22* (2006.01)
*G06K 19/077* (2006.01)
(Continued)

(52) U.S. Cl.
CPC ..... *H01Q 1/2225* (2013.01); *G06K 19/07735* (2013.01); *G06K 19/07773* (2013.01); *H01Q 1/38* (2013.01); *H01Q 9/0407* (2013.01)

(58) Field of Classification Search
CPC ...... H01Q 1/2225; H01Q 1/38; H01Q 9/0407; H01Q 9/265; G06K 19/07735; G06K 19/07773
See application file for complete search history.

(56) References Cited

U.S. PATENT DOCUMENTS 10,089,573 B2 * 10/2018 Sugimura ............ H01Q 1/2225
10,218,085 B2 * 2/2019 Huang .................... H01Q 1/243
(Continued)

FOREIGN PATENT DOCUMENTS

JP 2007-124696 A 5/2007
JP 2012-253700 A 12/2012
(Continued)

OTHER PUBLICATIONS

International Search Report for PCT/JP2018/034537 dated Nov. 20, 2018.

*Primary Examiner* — Seung H Lee
(74) *Attorney, Agent, or Firm* — Pearne & Gordon LLP (57) ABSTRACT

An RF tag has a particular structure of an RF tag antenna to which an IC chip is mounted. The RF tag antenna includes: an inductor pattern section having a C-shape and configured in a form of a flat plate; a notch section formed by cutting out a periphery of the inductor pattern section; an antenna section formed around the notch section; and a ground section provided in continuation with the inductor pattern section and configured in a form of a flat plate.

12 Claims, 6 Drawing Sheets

(51) Int. Cl.
  *H01Q 1/38* (2006.01)
  *H01Q 9/04* (2006.01)

(56) References Cited

U.S. PATENT DOCUMENTS 10,248,904 B2 * 4/2019 Akamatsu ............... H01Q 19/22
10,311,355 B1 * 6/2019 Hahn .................. G06K 19/0776

FOREIGN PATENT DOCUMENTS

| JP | 20131-110685 A | 6/2013 |
| WO | 2009/014213 A | 1/2009 |
| WO | 2016/129542 A | 8/2016 |

* cited by examiner

RF TAG ANTENNA, RF TAG, AND RF TAG HAVING CONDUCTIVE BODY FORMED THEREIN

TECHNICAL FIELD

The present invention relates to an RF tag antenna, an RF tag, and an RF tag with a conductor.

BACKGROUND ART

In recent years, in management systems for inventory management of products or parts, logistics management, etc., RFID (Radio Frequency Identification) technology has been utilized. In systems that use the RFID technology, wireless communications are performed between an RF tag and a reader-writer (hereinafter referred to as a "reading device") and identification information and the like stored in the RF tag is read by the reading device.

For example, Patent Literature 1 (Japanese Patent Laid-Open No. 2012-253700) discloses a wireless communication device, its manufacturing method, and a metal article with the wireless communication device which facilitate installation of a radiation conductor and a ground conductor to improve connection reliability between the conductors.

The wireless communication device described in Patent Literature 1 comprises an inverted F-type antenna which includes: a dielectric block having a first main surface and a second main surface facing the first main surface; a radiation conductor provided on the first main surface of the dielectric block; a ground conductor provided on the second main surface of the dielectric block; feed conductor for connecting a wireless IC element processing a high-frequency signal to the radiation conductor and the ground conductor; and a short circuit conductor for connecting the radiation conductor to the ground conductor, where at least the radiation conductor, the ground conductor, the feed conductor, and the short circuit conductor are each formed as a flat-plate-shape metal conductor; and the metal conductors are disposed at its radiation conductor part on the first main surface of the dielectric block, at its ground conductor part on the second main surface of the dielectric block, at its feed terminal part mainly on a side of the dielectric block, and at its short circuit conductor part mainly on a side of the dielectric block.

Patent Literature 2 (Japanese Patent Laid-Open No. 2007-124696) discloses a wide band antenna apparatus, reduced in height, also available in a communication system where an ultra wide band (UWB) and small-sized antenna apparatus are required, such as a Broadband-PAN (Personal Area Network) utilizing UWB technologies.

The wide band antenna apparatus described in Patent Literature 2 is a wide band antenna apparatus that comprises a conductor ground plate and a radiation conductor plate at least portions of which face one another, where a magnetic substance whose relative permeability in the radio frequency in use becomes greater than 1 and approximately equal to or smaller than 8 is interposed between the conductor ground plate and the radiation conductor plate.

Patent Literature 3 (Japanese Patent Laid-Open No. 2013-110685) discloses a thin antenna for reading an RFID tag, used in radio wave of the UHF band, and capable of excellently performing communications even when mounted on a metallic component.

The thin antenna described in Patent Literature 3 comprises: a magnetic sheet; an antenna section disposed on one surface of the magnetic sheet; and a conductor ground plate disposed at the other surface of the magnetic sheet, where the antenna section and the conductor ground plate are disposed so that at least parts of them are overlapped with each other when viewed in a thickness direction of the magnetic sheet, and the thickness of the magnetic sheet is 200 µm or more and 600 µm or less.

CITATION LIST

Patent Literature

Patent Literature 1: Japanese Patent Laid-Open No. 2012-253700
Patent Literature 2: Japanese Patent Laid-Open No. 2007-124696
Patent Literature 3: Japanese Patent Laid-Open No. 2013-110685

SUMMARY OF INVENTION

Technical Problem

In the prior-art document 1, an RF tag antenna of an inverted-F type is disclosed. However, there is a problem that long distance reading is not possible even when a dielectric body is used.

Also, in Patent Literatures 2 and 3, there is a problem that manufacturing costs increase due to the complexity of the structure such as feeding electrical power using coaxial lines or strip lines, and there is another problem that it is difficult to adjust resonant frequency according to the applications.

Also, yet there is another problem that when an RF tag is placed close to a conductor, the resonant frequency is shifted and this may hinder the communications, and still there is another problem that communication is not possible when radio wave is irradiated on the back of the RF tag installation surface.

A main object of the present invention is to provide an RF tag antenna, an RF tag, and an RF tag with a conductor which are omnidirectional and have long communication distance.

Solution to Problem (1)

An RF tag antenna in accordance with one aspect is an RF tag antenna to which an IC chip is mounted, the RF tag antenna including: an inductor pattern section having a C-shape and configured in a form of a flat plate; a notch section formed by cutting out a periphery of the inductor pattern section; an antenna section formed around the notch section; and a ground section provided in continuation with the inductor pattern section and configured in a form of a flat plate.

In this case, by virtue of the fact that the IC chip is provided to bridge both ends of the C-shape, a resonant circuit is formed by the inductor pattern section and capacitance inside the IC chip.

Also, the resonant circuit enables omnidirectional communications between the RF tag and a reading device, and thinning or miniaturization of the RF tag can be achieved.

It should be noted that, in the present embodiment, a thin film indicates a range of thickness of 3 µm or more and 35 µm or less.

Also, with regard to the antenna section, any one antenna from among dipole antennas, collinear array antennas, and monopole antennas can be used.

(2)

An RF tag antenna in accordance with another aspect is an RF tag antenna to which an IC chip is mounted, the RF tag antenna including: an inductor pattern section having a C-shape and configured in a form of a flat plate; a notch section formed by cutting out a periphery of the inductor pattern section; an antenna section formed around the notch section; an insulating substrate having a first surface and a second surface facing the first surface; and a ground section provided in continuation with the inductor pattern section and configured in a form of a flat plate, where the inductor pattern section, the notch section, and the antenna section are formed on the first surface, and the ground section is formed on the second surface.

In this case, by virtue of the fact that the IC chip is provided to bridge both ends of the C-shape, a resonant circuit is formed by the inductor pattern section, and capacitances inside the IC chip and the insulating substrate, and an omnidirectional RF tag can be configured.

(3)

An RF tag antenna in accordance with a still another aspect is an RF tag antenna to which an IC chip is mounted, the RF tag antenna including: an inductor pattern section having a C-shape and configured in a form of a flat plate; a notch section formed by cutting out a periphery of the inductor pattern section; an antenna section formed around the notch section; an insulating substrate having a first surface and a second surface facing the first surface; and a ground section provided in continuation with the inductor pattern section and configured in a form of a flat plate, the inductor pattern section, the notch section, and the antenna section are formed in the first surface, and the ground section is formed on a surface which is an extended surface of the second surface and does not face the first surface.

In this case, by virtue of the fact that the IC chip is provided to bridge both ends of the C-shape, a resonant circuit is formed by the inductor pattern section, capacitances inside the IC chip and the insulating substrate, and an omnidirectional RF tag can be configured.

Also, by virtue of the fact that the ground section is formed on the surface which is the extended surface of the second surface and does not face the first surface, a further low-profile configuration can be achieved.

(4)

In an RF tag antenna in accordance with a fourth invention, which is in the context of the RF tag antennas in accordance with one aspect, the other aspect, and the still other aspect, a periphery length of the antenna section may be $\lambda/2$, where $\lambda$ is a frequency of a target radio wave.

In this case, since the periphery length of the antenna section becomes $\lambda/2$, where $\lambda$ is the frequency of the target radio wave, the RF tag having a long communication distance can be provided.

(5)

An RF tag antenna in accordance with a fifth invention, which is in the context of the RF tag antenna in accordance with any one of the other aspect to the fourth invention, the insulating substrate may be made of dielectric.

In this case, since the insulating substrate is configured by dielectric, a small RF tag of several millimeters size can be achieved.

(6)

In an RF tag antenna in accordance with a sixth invention, which is in the context of the RF tag antenna in accordance with any one from the other aspect to the fourth invention, the insulating substrate may be made of polystyrene foam.

In this case, since the insulating substrate is made of polystyrene foam, an RF tag of several-centimeters size can be achieved. Also, by using polystyrene foam, the insulating substrate similar to air can be used.

Also, a large opening between the antenna section and the ground section can be ensured.

(7)

In an RF tag antenna in accordance with a seventh invention, which is in the context of the RF tag antenna in accordance with any one from the other aspect to the sixth invention, the insulating substrate may be configured such that a relative permittivity on the first surface side and a relative permittivity on the second surface side may be different from each other.

In this case, since the relative permittivity on the first surface side and the relative permittivity on the second surface side are different from each other, the state is apparently the same as the state where a conductive plate is provided, so that the communication distance for communications with the reading device can be extended.

It should be noted that with regard to the characteristics that the relative permittivity on the first surface side and the relative permittivity on the second surface side are different from each other, the components on the first surface side and the second surface side may be changed, two different layers may be used to form the insulating substrate, or the insulating substrate may be formed of one layer, and doping may be performed on one side of the first surface side or the second surface side.

(8)

In an RF tag antenna in accordance with an eighth invention, which is in the context of the RF tag antenna in accordance with any one from the other aspect to the sixth invention, one or more holes may be formed in the insulating substrate, wherein the holes have the same or different diameters and gradually decrease from the first surface side to the second surface side.

In this case, since the one or more holes are formed in the insulating substrate, and the holes have the same or different diameters and gradually decrease from the first surface side to the second surface side, the state is apparently the same as the state where a conductive plate is provided, so that the communication distance for communications with the reading device can be extended.

(9)

In an RF tag antenna in accordance with a ninth invention, which is in the context of the RF tag antenna in accordance with any one from the other aspect to the sixth invention, the insulating substrate may be formed such that a relative permittivity on the first surface side becomes smaller than a relative permittivity on the second surface side.

In this case, since the insulating substrate is formed such that the relative permittivity on the first surface side becomes smaller than the relative permittivity on the second surface side, the state is apparently the same as the state where a conductive plate is provided, so that the communication distance for communications with the reading device can be extended.

(10)

In an RF tag antenna in accordance with a tenth invention, which is in the context of the RF tag antenna in accordance with any one from the other aspect to the eighth invention, the insulating substrate may be configured such that a layer of polystyrene foam is formed on the first surface side and a layer having a relative permittivity higher than the relative permittivity of the polystyrene foam is formed on the second surface side.

In this case, since the insulating substrate is formed such that the relative permittivity on the first surface side becomes smaller than the relative permittivity on the second surface side, the state is apparently the same as the state where a conductive plate is provided, so that the communication distance for communications with the reading device can be extended.

(11)

An RF tag in accordance with still another aspect includes: the RF tag antenna according to any one of claims 1 to 10; and an IC chip provided to bridge both ends of the C-shape of the RF tag antenna.

In this case, by virtue of the fact that the IC chip bridges both ends of the C-shape, a resonant circuit is formed by the inductor pattern section, and capacitances inside the IC chip and the insulating substrate. Hence an omnidirectional RF tag can be configured.

(12)

An RF tag with a conductor in accordance with still another aspect includes: the RF tag antenna according to any one of claims 1 to 10; an IC chip provided to bridge both ends of the C-shape of the RF tag antenna; and a conductor connected to a ground section of the RF tag antenna directly or electrically via a capacitance.

In this case, by virtue of the fact that the IC chip bridges both ends of the C-shape, a resonant circuit is formed by the inductor pattern section, and capacitances inside the IC chip and the insulating substrate. Further, the conductor can be utilized as an antenna.

DESCRIPTION OF EMBODIMENT

An embodiment of the present invention will be described hereinbelow with reference to the drawings. In the following explanations, the same components are indicated by the same reference signs. Also, when the same reference signs are assigned to components, they are the same ones which have the same name and the same function. Accordingly, detailed explanations thereof will not be repeated.

Present Embodiment

Figure 1:
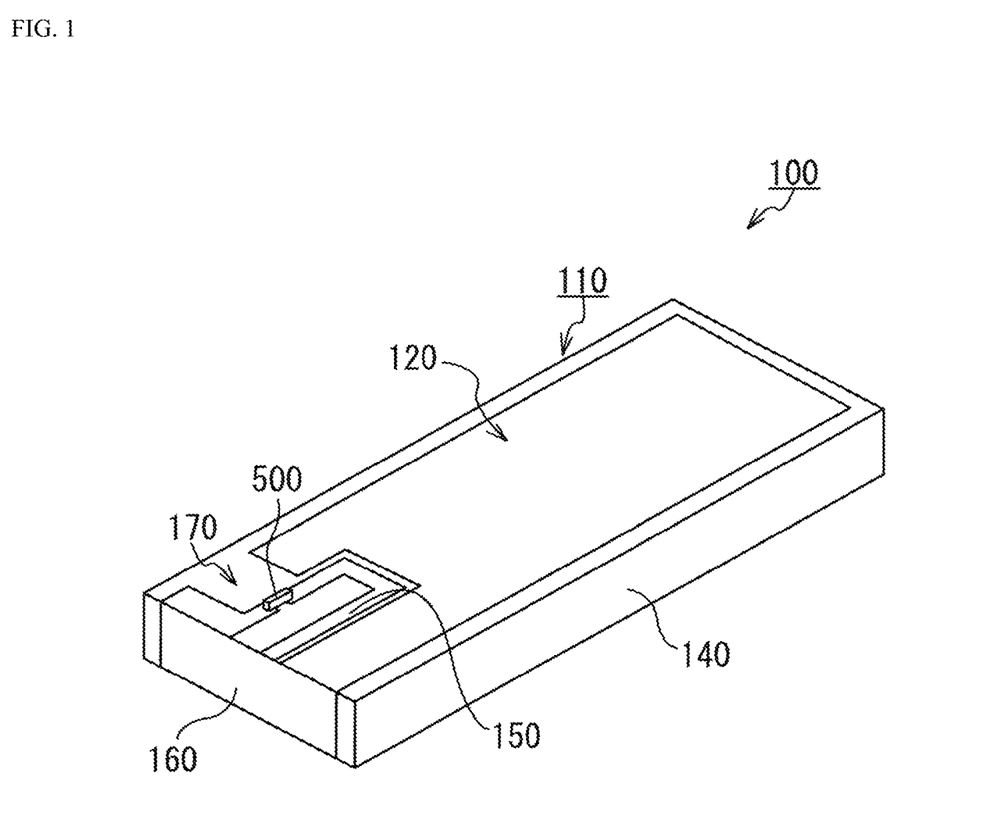
FIG. 1 is a schematic perspective view that illustrates an example of an RF tag.
Figure 2:
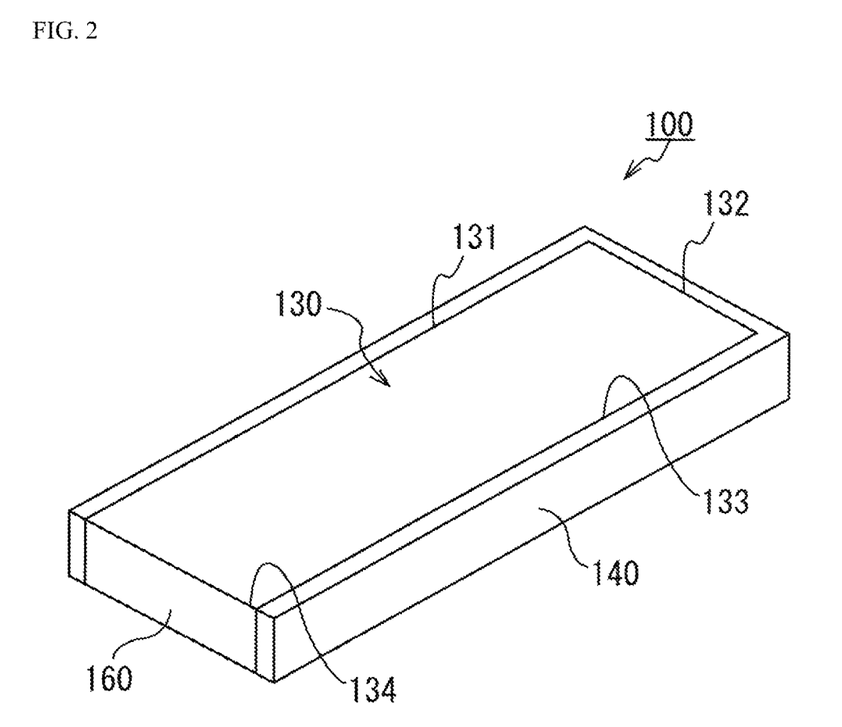
FIG. 2 is a schematic perspective view that illustrates an example of a back surface of the RF tag.

FIG. 1 is a schematic perspective view that illustrates an example of an RF tag 100 in accordance with the present embodiment and FIG. 2 is a schematic perspective view that illustrates an example of the back surface of the RF tag 100.

As illustrated in FIG. 1, the RF tag 100 includes an RF tag antenna 110, an insulating substrate 140, and an IC chip 500. Note that the RF tag 100 of FIG. 1 may be packed by a sheet member 600 (see FIG. 5).

The RF tag antenna 110 includes an antenna section 120, a ground section 130, an inductor pattern section 150, and a short-circuit section 160.

Insulating Substrate 140

In the present embodiment, the insulating substrate 140 is made of polystyrene foam. Ideally, it is most preferable to fill with air instead of the insulating substrate but, in order to maintain a predetermined interval between the antenna section 120 and the ground section 130 and prevent them from being brought into contact with each other, it is preferable to utilize polystyrene foam having 90% or more by volume of air. Further preferably, it is closed-cell polystyrene foam having 95% or more by volume and 99% or less by volume of air.

As a result of this, the spatial distance between the antenna section 120 and the ground section 130 can be maintained as a predetermined interval. As such an interval, an interval of 0.5 mm or more and 3.0 mm or less is preferable. Also, it is desirable that a relative permittivity of the insulating substrate falls within the range from 1% or more and 20% or less. More desirably, the range is 1.01% or more and 1.20% or less, and most desirably 1.01% or more and 1.10% or less, and further most desirably 1.02% or more and 1.08% or less. In the case where polystyrene foam is used as the insulating substrate 140, it is preferable that the polystyrene foam has a foaming ratio of 15 times or more to 60 times or less (in this case, the relative permittivity will be 1.01% or more and 1.10% or less).

In the case where ceramic (whose relative permittivity is higher than 5% and equal to or less than 9%) is used as the insulating substrate 140, the opening area of the antenna section 120 and the ground section 130 becomes small and the communication distance is reduced, but reduction in the size of the RF tag 100 can be achieved.

On the other hand, in the case where a material having the relative permittivity of 1% or more and 5% or less (in particular, 1.01% or more and 1.20% or less) such as polystyrene foam is used as the insulating substrate 140, then the opening area of the antenna section 120 and the ground section 130 can be maintained as a large area and the communication distance can be extended to several meters to tens of meters.

It should be noted that the thickness of the insulating substrate 140 made of polystyrene foam is desirably in the range between 0.5 mm and 3 mm including these values.

It should be noted that, in the present embodiment, while the insulating substrate 140 is made of polystyrene foam, this does not constitute a limitation thereto, and any insulator may be used and other foams or materials having insulating property such as polyethylene, polyimide, and thin foam (volara) may be used.

As has been described in the foregoing, with regard to the RF tag antenna 110 in accordance with the present embodiment, since polystyrene foam is used as the insulating substrate 140 of the RF tag antenna 110, an opening area of a certain size can be provided, and the sensitivity of the plate-shaped antenna can be improved.

It should be noted that, in the above-described embodiment, while the case has been described where the polystyrene foam is used as the insulating substrate 140, dielectric may be used. For example, as dielectric, resin, ceramic, paper, etc. may be used. Further, the insulating substrate may have a foam shape, may have one or numerous cavities, and may be made of composite material in which different materials are mixed or stacked.

Figure 3:
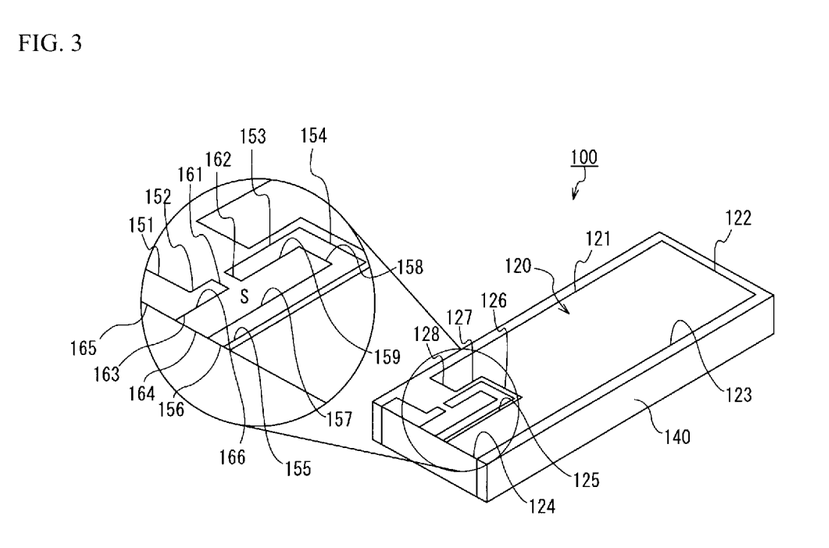
FIG. 3 is a schematic perspective view for explanation of an example of a configuration of an antenna section.
Figure 4:
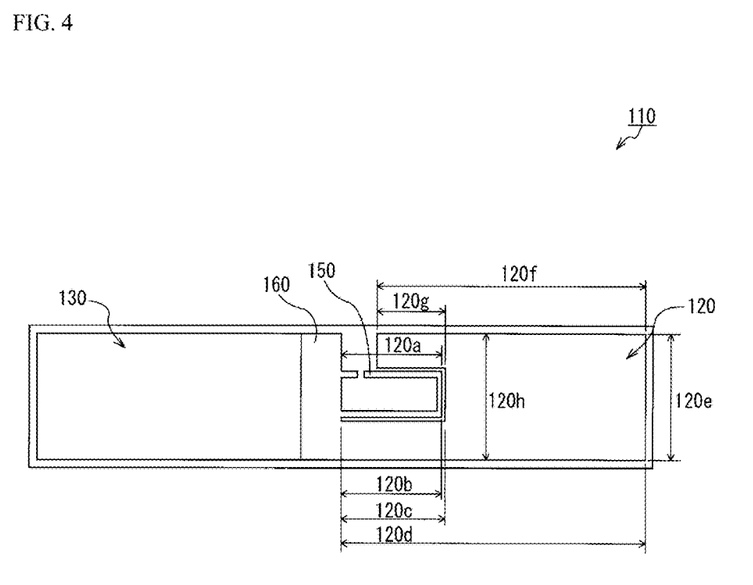
FIG. 4 is a top view that illustrates an example of an expanded view of an RF tag antenna.

FIG. 3 is a schematic perspective view for explanation of an example of a configuration of the antenna section 120 and FIG. 4 is a top view that illustrates an example of an expanded view of the RF tag antenna 110.

Antenna Section 120

As illustrated in FIG. 3, the antenna section 120 is formed by the region enclosed by a side 121, a side 122, a side 123, a side 124, a side 125, a side 126, a side 127, and a side 128.

In the antenna section 120 of the present embodiment, the value obtained by adding the total value of the sides 121, 122, 123, 124, 125, 126, 127, and 128 and the total value of the sides 155, 154, 153, and 152, is the value T. The side 152, the side 153, the side 154, and the side 155 define outer periphery of the inductor pattern section 150.

In other words, as illustrated in FIG. 4, the value T can be determined as: 120a+120b+120c+120d+120e+120f+120g.

The value T is designed such that it corresponds to any one of λ/4, λ/2, 3λ/4, and 5λ/8 in case the wavelength λ (lambda) of the radio wave is used.

In the present embodiment, the value T is designed as half the length of the wavelength λ of the frequency in use. The wavelength λ can be calculated as "propagation speed (light speed (c))/frequency (F).

Specifically, in the case where the frequency is 920 MHz, the propagation speed (light speed (c)) is 300 Mm/s, and the value T will be value T=(300÷920 MHz)/2≈163 mm.

In this case, the lengths of the individual sides are adjusted such that the value T becomes 163 mm. Note that, since the value T is an approximate value, the numerical value of the value T as such may have an error of around ±5%. This is because it can be brought into conformity with the design specifications through adjustments though the read distance of the RF tag 100 becomes shorter.

Also, in the present embodiment, the first waveguide section is made of an aluminum metal thin film. In general, the thin film in the present embodiment is formed with a thickness in the range from 3 μm to 35 μm including these values.

The first waveguide section is formed by techniques such as etching or pattern printing.

Ground Section 130

Next, as illustrated in FIG. 2, the ground section 130 is formed by the region enclosed by a side 131, a side 132, a side 133, and a side 134.

The ground section 130 is made of an aluminum metal thin film. In general, the thin film in the present embodiment is formed with a thickness in the range from 3 μm to 35 μm including these values.

The ground section 130 is formed by techniques such as etching or pattern printing.

Notch Section 170

Also, although a notch section 170 is a spatial region and accordingly is not an element constituting the RF tag antenna 110, for convenience of explanation, the description will be provided with a reference numeral assigned thereto.

The notch section 170 is formed by the region enclosed by the side 128, the side 127, the side 126, the side 125, the side 155, the side 154, the side 153, the side 152, and the side 151.

Inductor Pattern Section 150

As illustrated in FIGS. 1 and 3, the inductor pattern section 150 is configured by a shape obtained by cutting out a portion between a side 161 and a side 162 as part of the circuit of a ring shape. In other words, it is configured by the shape of a C of an alphabetic character.

In other words, as illustrated in FIG. 3, it is configured by the region enclosed by a side 157, a side 158, a side 159, a side 164, and a side 166 (internal area S).

It should be noted that, with regard to the inductor pattern section 150, while the case has been described in which the portion between the side 161 and the side 162 is cut out, this does not constitute a limitation thereto, and an insulating section may be formed between the side 161 and the side 162.

In the present embodiment, the inductor pattern section 150 is made of an aluminum metal thin film. In general, the thin film in the present embodiment is formed with a thickness in the range from 3 μm to 35 μm including these values.

The inductor pattern section 150 is formed by techniques such as etching or pattern printing.

Also, the IC chip 500 is provided such that it bridges the side 161 and the side 162 of the inductor pattern section 150.

In the present embodiment, the impedance of the inductor pattern section 150 can be made constant according to the internal area S of the inductor pattern section 150.

IC Chip 500

The IC chip 500 is arranged on the upper surface of the RF tag antenna 110 (to be flush with the antenna section 120). The IC chip 500 operates based on the radio wave received by the plate-shaped antenna of the RF tag antenna 110.

Specifically, the IC chip 500 in accordance with the present embodiment first rectifies part of the carrier wave transmitted from a reading device and the IC chip 500 generates a power supply voltage necessary for itself to operate. Then the IC chip 500 causes the logic circuit for control in the IC chip 500 and non-volatile memory that stores product specific information or the like to operate by the power supply voltage that has been generated. Also, the IC chip 500 causes a communication circuit or the like for performing transmission and reception of data with the reading device to operate.

Sheet Member 600

Figure 5:
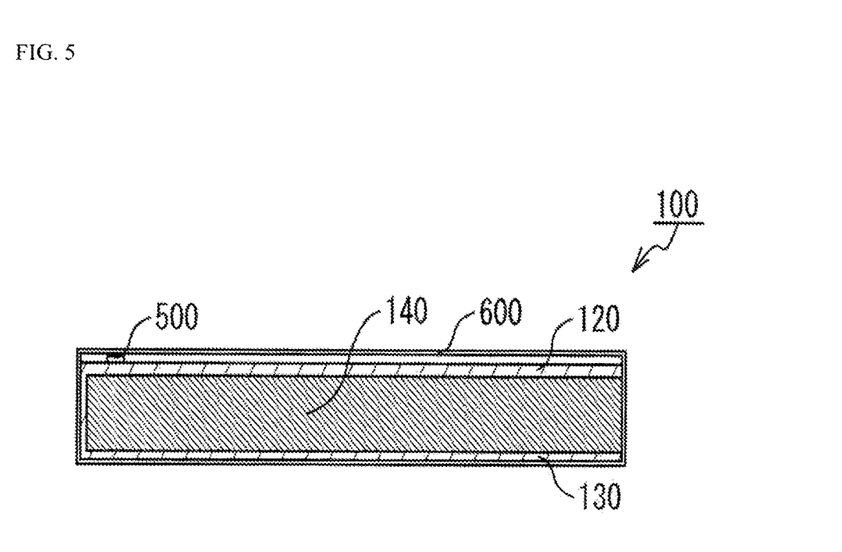
FIG. 5 is a schematic cross-sectional view that illustrates a state where a sheet member is provided on the RF tag.

FIG. 5 is a schematic cross-sectional view that illustrates a state where the sheet member 600 is provided on the RF tag 100 of FIGS. 1 to 4.

As illustrated in FIG. 5, with regard to the RF tag 100, its peripheral sections may be covered by the sheet member 600. Here, the peripheral sections refer to the entire peripheral section of the RF tag 100. Note that covering the entire peripheral sections by the sheet member 600 does not constitute a limitation thereto and only the IC chip 500, the antenna section 120, and the ground section 130 may be covered.

The sheet member 600 is mainly made of polyethylene terephthalate. It should be noted that, in addition to polyethylene terephthalate, one or more types of materials or resins having insulating property such as polyimide and polyvinyl chloride may also be used as the sheet member 600.

The sheet member 600 is used to protect the antenna section 120 and the ground section 130. For this reason, the sheet member 600 preferably has a thickness of several micrometers or more and several hundred micrometers or less, more preferably about several tens of micrometers.

Accordingly, while the sheet member 600 is to be provided in the present embodiment, this does not constitute a limitation thereto, and the sheet member 600 may not be provided and other insulation coating treatments may be used.

RF Tag Antenna 110, IC Chip 500, and Electrically Conductive Member 900

Figure 6:
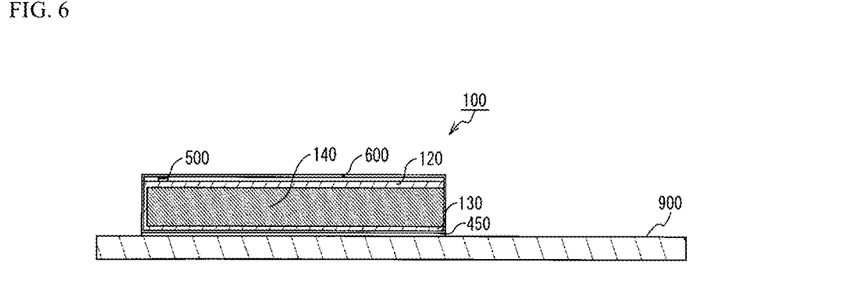
FIG. 6 is a schematic cross-sectional view that illustrates an example where the RF tag is stuck on an electrically conductive member.

FIG. 6 is a schematic cross-sectional view that illustrates an example where the RF tag 100 depicted in FIGS. 1 to 5 is stuck on an electrically conductive member 900.

As illustrated in FIG. 6, the RF tag 100 is stuck on the electrically conductive member 900 by means of a conductive adhesive, an adhesive layer 450, or the like. In the present embodiment, the electrically conductive member 900 is made of a metal plate having conductive property. Specifically, it has any appropriate metal portion such as a metal box, a box or a case containing a metal plate, a box or a case containing a metal member.

It should be noted that while the conductive adhesive or the adhesive layer 450 is to be used in FIG. 6, this does not constitute a limitation thereto, and it may be a conductive double-sided tape, solder, or, any appropriate conductive adhesives such as 1-component or 2-component epoxy resin.

Figure 7:
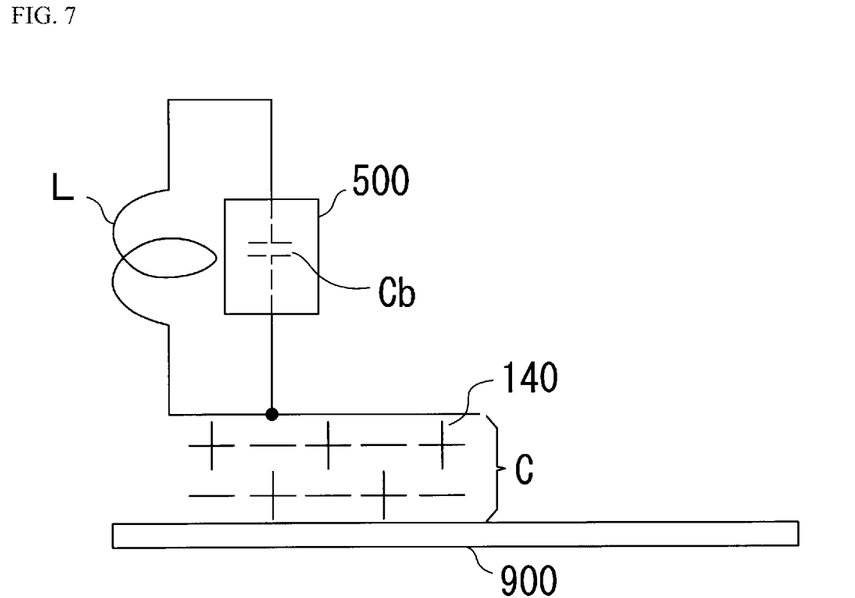
FIG. 7 is a schematic diagram that illustrates an example of an equivalent circuit of the RF tag and the electrically conductive member.

FIG. 7 is a schematic diagram that illustrates an example of an equivalent circuit of the RF tag 100 and the electrically conductive member 900.

As illustrated in FIG. 7, with regard to the equivalent circuit of the RF tag 100 and the electrically conductive member 900, the inductor pattern L of the inductor pattern section 150 and the capacitor $C_b$ configured by an internal capacitance of the IC chip 500 are connected in parallel. The inductor pattern L and the IC chip 500 configures a resonant circuit that resonates in the frequency band of the radio wave transmitted from the reading device.

The resonant frequency f (Hz) of this resonant circuit is given by the expression (1). The value of the resonant frequency f is tuned such that it falls within the frequency band of the radio wave transmitted from the reading device.

[Expression 1]

$$f = \frac{1}{2\pi\sqrt{L_a \cdot C_b}} \quad (1)$$

In the expression (1), $L_a$ represents the inductance of the inductor pattern L, and $C_b$ represents the equivalent capacitance inside the IC chip 500.

Here, some components have a capacitor inside the IC chip 500 and the IC chip 500 has stray capacitance. For this reason, when the resonant frequency f of the resonant circuit is to be specified, the equivalent capacitance $C_b$ inside the IC chip 500 is used.

In other words, the resonant circuit has a resonant frequency f that has been set with the inductance of the inductor pattern L and the equivalent capacitance $C_b$ inside the IC chip 500 taken into account. It should be noted that, as the $C_b$, for example, it is possible to use a capacitance value disclosed as one of the specification data of the IC chip to be used.

As has been described in the foregoing, by using the equivalent capacitance $C_b$ inside the IC chip 500, no new capacitor needs to be provided. Also, the resonant frequency f of the resonant circuit can be accurately set in the frequency band of the radio wave.

In addition, it is also possible to use the capacitor capacitance C of the insulating substrate 140. As a result, the reading performance of the RF tag 100 can be further improved. Also, the power supply voltage generated by the IC chip 500 can be further increased.

Also, as illustrated in FIG. 7, since the electrically conductive member 900 can be used in the same or similar manner as the antenna section 120, the radio wave of the reading device can be received from either the front surface side or the back surface side of the electrically conductive member 900.

It should be noted that while the case has been described in the present embodiment where the sheet member 600 is disposed between the ground section 130 of the RF tag 100 and the electrically conductive member 900, they may be electrically connected to each other either directly or indirectly.

Further, in the present embodiment, the electrically conductive member 900 may be made of a metal plate. Note that, with regard to the "conductor" in the context of the present application, a typical example thereof is "electrical conductivity, metal" in the same manner as in a general lexical meaning. However, the "conductor" is not limited to metal and may be, for example, a human body, a plant, water, the ground, etc.

Figure 8:
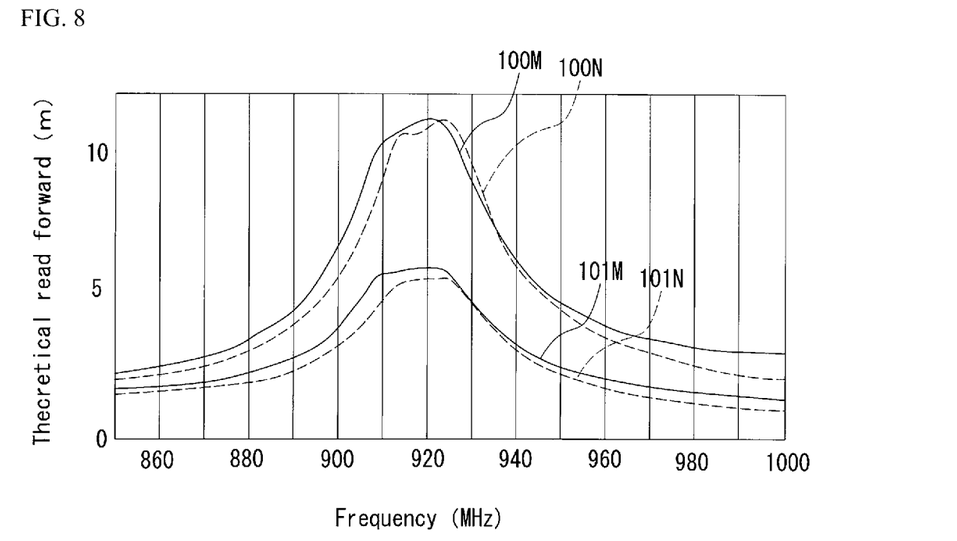
FIG. 8 is a schematic diagram that shows results of a reading experiment of the RF tag.

FIG. 8 is a schematic diagram that shows the results of the reading experiment of the RF tag 100 described in FIGS. 1 to 7.

The symbol 100M in FIG. 8 is a curve which indicates a relationship between a frequency (horizontal axis) and a theoretical reading distance (m) (vertical axis) in the case where the reading experiment is done using the reading device from the front surface side of the RF tag 100 in accordance with the present embodiment.

And the symbol 101M is a curve which indicates a relationship between a frequency (horizontal axis) and a theoretical reading distance (m) (vertical axis) in the case where the reading experiment is done using the reading device from the back surface side of the RF tag 100 in accordance with the present embodiment.

The symbol 100N is a curve which indicates a relationship between a frequency (horizontal axis) and a theoretical reading distance (m) (vertical axis) in the case where the reading experiment is done using the reading device from the front surface side of a in-house RF tag (product name 06) of an inverted-F antenna type.

And the symbol 100M is a curve which indicates a relationship between a frequency (horizontal axis) and a theoretical reading distance (m) (vertical axis) in the case where the reading experiment is done using the reading device from the back surface side of the in-house RF tag (product name 06) of the inverted-F antenna type.

As illustrated in FIG. 8, the RF tag 100 in accordance with the present embodiment is capable of reading with a distance of 13 m if the reading device is used from the front surface side (solid line 100M).

On the other hand, if the reading device is used from the back surface side (solid line 101M), the RF tag 100 is capable of reading with a distance of 7 m.

As a result of this, it has been revealed that the RF tag 100 in accordance with the present embodiment exhibits the same or better performance as the in-house inverted F antenna type RF tag in the case where the reading device is used both from the front surface side (broken line 100N) and from the back surface side (broken line 101N).

Insulating Substrate

Figure 9:
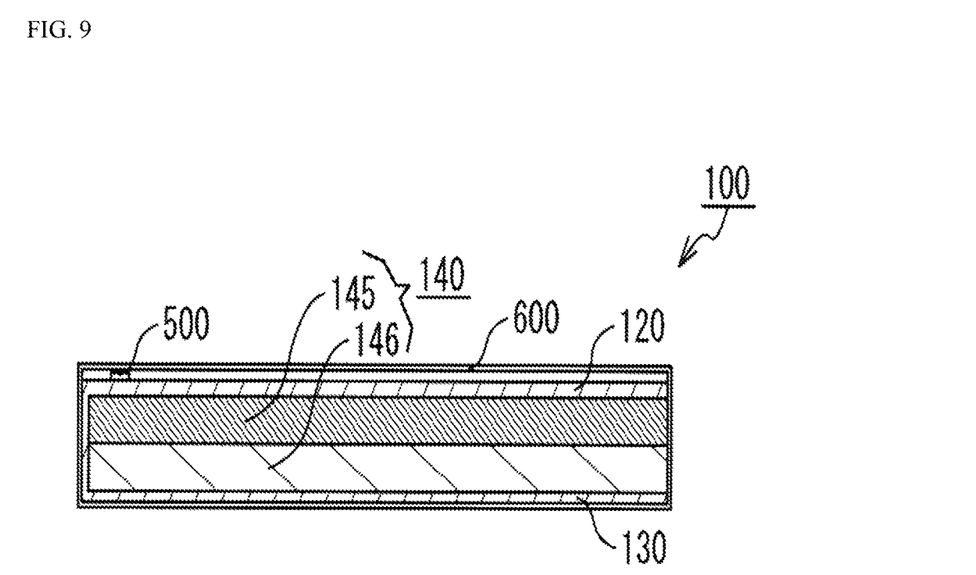
FIG. 9 is a schematic diagram that illustrates another example of an insulating substrate.

FIG. 9 is a schematic diagram that illustrates another example of the insulating substrate 140.

As illustrated in FIG. 9, the insulating substrate 140 may be made of a laminate of a polystyrene foam material 145 and a resin material 146. In the present embodiment, the polystyrene foam material 145 is stacked on the antenna section 120 side, but the resin material 146 may also be stacked on the antenna section 120 side.

In the present embodiment, the polystyrene foam material 145 and the resin material 146 are both designed to have the same size length. In the present embodiment, ABS was used as the resin material. Note that ABS is used in the present embodiment but this does not constitute a limitation thereto, and polyethylene, polypropylene, polyvinyl chloride, ceramic, paper, etc. may be used.

Specifically, in the polystyrene foam material 145, the wavelength λ1 is calculated assuming that the relative permittivity of the polystyrene foam material 145 εa is 1.0 and the frequency is 900 MHz.

As a result of this, since the antenna section 120 stuck on the polystyrene foam material 145 is not influenced by the relative permittivity, the wavelength λ1 will be λ1=(300/920 MHz)/1²≈333 mm.

Meanwhile, in the resin material 146, the wavelength λ2 is calculated assuming that the relative permittivity of the resin material 146 εb is 5.0, the frequency is 900 MHz, and propagation speed is 300 Mm/s.

As a result of this, in the resin material 146, the wavelength λ2 will be λ2=(300/920 MHz)/5²≈149 mm.

It should be noted that ceramic, paper, etc. may be used instead of the resin material 146.

Here, since the value T1 of the antenna section 120 is 333 mm, resonance will take place at 402 MHz of the wavelength 333/149≈2.23 times longer.

In other words, this is equivalent to a state where the apparently 744 mm-long ground section 130 is formed.

As a result of this, the state can be made to be the same as the state where the RF tag 100 is mounted to a conductive member 900, and the RF tag 100 having a sufficient communication distance for metal or non-metal applications can be achieved.

Insulating Substrate

Figure 10:
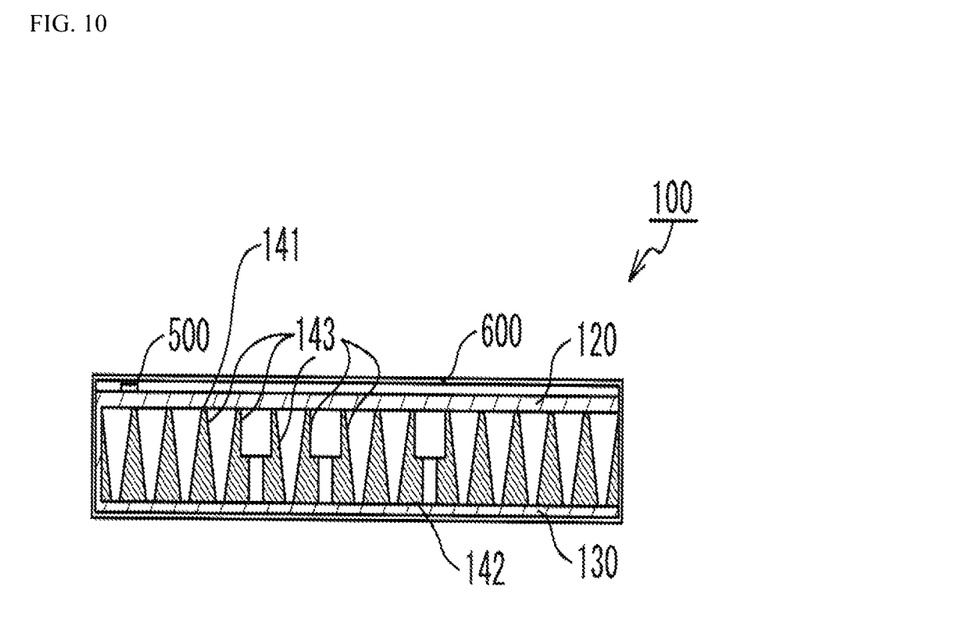
FIG. 10 is a schematic cross-sectional view that illustrates still another example of the insulating substrate.

FIG. 10 is a schematic cross-sectional view that illustrates still another example of the insulating substrate 140.

As illustrated in FIG. 10, the insulating substrate 140 has a front surface 141 and a back surface 142.

Also, it has one or more holes 143 whose diameter gradually decreases from the front surface 141 to the back surface 142. Here, the hole 143 is not limited to the one whose diameter continuously decreases and may encompass those the diameter of which decreases in a stepwise fashion. According to such a structure, the insulating substrate 140 is obtained whose relative permittivity differs in the direction of the thickness of the insulating substrate 140. In the embodiment illustrated in FIG. 10, the insulating substrate 140 is obtained whose relative permittivity decreases sequentially toward the antenna section 120 side.

In the present embodiment, the case is explained where the hole 143 has a stepwise or conical shape but this does not constitute a limitation thereto, and the hole 143 may be a cylinder, rectangular cylinder, or elliptical cylinder which does not penetrate the insulating substrate 140 from the front surface 141 to the back surface 142 or may also be a conical cylinder, pyramidal cylinder, or elliptical conical cylinder which does not penetrate or penetrates the insulating substrate 140 from the front surface 141 to the back surface 142.

Further, the shape of a cavity portion of the hole may change from the front surface 141 to the back surface 142. For example, on the front surface 141 side, the hole may be a star-shaped hole and the cross section of the hole may change to a shape of a circle toward the back surface 142 side.

Also, in FIG. 10, the explanations are given based on the case where the diameters of the holes 143 are the same, but this does not constitute a limitation thereto, and it may be the same or different.

Figure 11:
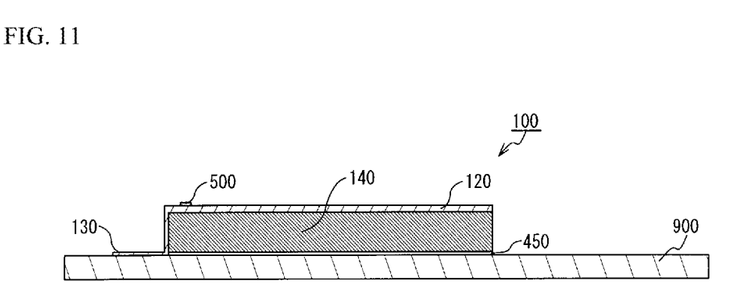
FIG. 11 is a schematic diagram that illustrates another example of the case where the RF tag is mounted to the electrically conductive member.

FIG. 11 is a schematic diagram that illustrates another example of the case where the RF tag 100 is mounted to the electrically conductive member 900.

As illustrated in FIG. 11, the antenna section 120 of the RF tag 100 may be extended until it reaches the back surface side of the insulating substrate 140 and the ground section 130 of the extended RF tag 100 may be mounted to the electrically conductive member 900. In this case, a low-profile configuration can be achieved.

As described above, by changing the relative permittivity on the side of the front surface 141 and the relative permittivity on the side of the back surface 142, apparently, the ground section 130 which is longer than a predetermined length will be formed, so that the RF tag 100 having a sufficient communication distance for metal or non-metal applications can be achieved.

As has been described in the foregoing, according to the RF tag 100 and the electrically conductive member 900, since the electrically conductive member 900 can be utilized as the antenna section 120 and a large opening area can be provided, the sensitivity of the RF tag 100 can be improved.

Also, since the electrically conductive member 900 can be utilized as the antenna section 120, it is made possible to perform reading by the reading device from the back surface side of the RF tag 100 on which the electrically conductive member 900 is provided.

In the present embodiment, the IC chip 500 corresponds to the "IC chip", the RF tag antenna 110 corresponds to the "RF tag antenna", the inductor pattern section 150 corresponds to the "inductor pattern section", the notch section 170 corresponds to the "notch section", the antenna section 120 corresponds to the "antenna section", the ground section 130 corresponds to the "ground section", the front surface 141 corresponds to the "first surface", the back surface 142 corresponds to the "second surface", the insulating substrate 140 corresponds to the "insulating substrate", the value T corresponds to the "periphery length of the antenna section", the resin material 146 corresponds to the "dielectric", the polystyrene foam material 145 and the polystyrene foam correspond to the "polystyrene foam", the hole 143 corresponds to the "one or more holes", RF tag 100 corresponds to the "RF tag", the electrically conductive member 900 corresponds to the "conductor", and the electrically conductive member 900 and the RF tag 100 correspond to the "RF tag with a conductor".

Whilst one preferred embodiment of the present invention has been described in the foregoing, the present invention is not limited thereto. It will be appreciated that other various embodiments may be conceived without departing from the purport and scope of the present invention. Further, while the operations and effects achieved by the features of the present invention have been described in the present embodiment, these operations and effects are merely examples by which the present invention is in no way limited.

REFERENCE SIGNS LIST

100 RF tag
110 RF tag antenna
120 antenna section
130 ground section
140 insulating substrate
141 front surface
142 back surface
143 hole
145 polystyrene foam material
146 resin material
150 inductor pattern section
170 notch section
500 IC chip
900 electrically conductive member
T value

What is claimed is:

1. An RF tag antenna to which an IC chip is mounted, the RF tag antenna comprising:
   an inductor pattern section having a C-shape and configured in a form of a flat plate;
   a notch section formed by cutting out a periphery of the inductor pattern section;
   an antenna section formed around the notch section; and
   a ground section provided in continuation with the inductor pattern section and configured in a form of a flat plate.

2. The RF tag antenna according to claim 1, which further includes an insulating substrate having a first surface and a second surface facing the first surface,
   wherein the inductor pattern section, the notch section, and the antenna section are formed on the first surface, and
   the ground section is formed on the second surface.

3. The RF tag antenna according to claim 2, wherein the insulating substrate is made of dielectric.

4. The RF tag antenna according to claim 2, wherein the insulating substrate is made of polystyrene foam.

5. The RF tag according to claim 2, wherein the insulating substrate is configured such that a relative permittivity on the first surface side and a relative permittivity on the second surface side are different from each other.

6. The RF tag according to claim 2, wherein one or more holes are formed in the insulating substrate, the holes having the same or different diameters, and gradually decreasing from the first surface side to the second surface side.

7. The RF tag according to claim 2, wherein the insulating substrate is formed such that a relative permittivity on the first surface side becomes smaller than a relative permittivity on the second surface side.

8. The RF tag according to claim 2, wherein the insulating substrate is configured such that a layer of polystyrene foam is formed on the first surface side and a layer having a relative permittivity higher than the relative permittivity of the polystyrene foam is formed on the second surface side.

9. The RF tag antenna according to claim 1, which further includes an insulating substrate having a first surface and a second surface facing the first surface,
   wherein the inductor pattern section, the notch section, and the antenna section are formed on the first surface, and
   the ground section is formed on a surface which is an extended surface of the second surface and does not face the first surface.

10. The RF tag antenna according to claim 1, wherein a periphery length of the antenna section is $\lambda/2$, where $\lambda$ is a wavelength of a target radio wave.

11. An RF tag comprising:
    the RF tag antenna according to claim 1; and
    an IC chip provided to bridge both ends of the C-shape of the RF tag antenna.

12. An RF tag with a conductor, comprising:
    the RF tag according to claim 11; and
    a conductor connected to the ground section of the RF tag antenna directly or electrically via a capacitor.

* * * * *